United States Patent
Pan et al.

(10) Patent No.: US 12,414,115 B2
(45) Date of Patent: Sep. 9, 2025

(54) TRANSMISSION METHOD AND APPARATUS, COMMUNICATION NODE, AND STORAGE MEDIUM

(71) Applicant: ZTE CORPORATION, Shenzhen (CN)

(72) Inventors: Yu Pan, Shenzhen (CN); Chuangxin Jiang, Shenzhen (CN); Shujuan Zhang, Shenzhen (CN); Zhaohua Lu, Shenzhen (CN); Bo Gao, Shenzhen (CN); Zhen He, Shenzhen (CN); Wenjun Yan, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 404 days.

(21) Appl. No.: 17/922,527

(22) PCT Filed: Apr. 29, 2021

(86) PCT No.: PCT/CN2021/090855
§ 371 (c)(1),
(2) Date: Oct. 31, 2022

(87) PCT Pub. No.: WO2021/219057
PCT Pub. Date: Nov. 4, 2021

(65) Prior Publication Data
US 2023/0171775 A1    Jun. 1, 2023

(30) Foreign Application Priority Data
Apr. 30, 2020   (CN) ................... 202010363319.6

(51) Int. Cl.
*H04W 72/20*   (2023.01)
*H04W 72/0446*   (2023.01)
*H04W 72/0453*   (2023.01)

(52) U.S. Cl.
CPC ....... *H04W 72/20* (2023.01); *H04W 72/0446* (2013.01); *H04W 72/0453* (2013.01)

(58) Field of Classification Search
CPC ............ H04W 72/20; H04W 72/0446; H04W 72/0453
See application file for complete search history.

(56) References Cited

U.S. PATENT DOCUMENTS

2020/0107341 A1    4/2020   Zhang et al.
2020/0154489 A1*   5/2020   Zhou ................ H04W 74/0838

FOREIGN PATENT DOCUMENTS

CN    110474751 A    11/2019
CN    110535597 A    12/2019
(Continued)

OTHER PUBLICATIONS

International Search Report in Application No. PCT/CN2021/090855, dated Jul. 19, 2021, 4 pages, including English translation.
(Continued)

*Primary Examiner* — Natasha W Cosme
(74) *Attorney, Agent, or Firm* — MORGAN, LEWIS & BOCKIUS LLP

(57) ABSTRACT

Provided are a transmission method and apparatus, a communication node, and a storage medium. The transmission method includes: determining control channel information and activated Transmission Configuration Indicator (TCI); determining a correspondence between the control channel information and the activated TCI; and receiving a control channel corresponding to the control channel information based on the correspondence and the activated TCI.

19 Claims, 3 Drawing Sheets

```
┌─────────────────────────────────────────────────────────┐
│ Determine control channel information and activated     │  S110
│       Transmission Configuration Indicator (TCI)        │
└─────────────────────────────────────────────────────────┘
                            │
                            ▼
┌─────────────────────────────────────────────────────────┐
│ Determine a correspondence between the control channel  │  S120
│           information and the activated TCI             │
└─────────────────────────────────────────────────────────┘
                            │
                            ▼
┌─────────────────────────────────────────────────────────┐
│   Receive a control channel corresponding to the        │  S130
│ control channel information based on the correspondence │
│                  and the activated TCI                  │
└─────────────────────────────────────────────────────────┘
```

(56) References Cited

FOREIGN PATENT DOCUMENTS

| | | | |
|---|---|---|---|
| CN | 110535598 | A | 12/2019 |
| CN | 110798894 | A | 2/2020 |
| CN | 110959304 | A | 4/2020 |
| CN | 110972288 | A | 4/2020 |
| CN | 111901876 | A | 11/2020 |
| EP | 3451553 | A2 | 3/2019 |
| EP | 3641461 | A | 4/2020 |

OTHER PUBLICATIONS

First Search Report in Chinese Application No. 2020103633196, dated Oct. 12, 2024, 9 pages, including translation.
First Office Action in Chinese Application No. 202010363319.6, dated Oct. 15, 2024, 30 pages, including translation.
Supplementary Partial European Search Report in Application No. 21795561.6, dated May 16, 2024, 27 pages.
Second Office Action in Chinese Application No. 202010363319.6, dated May 31, 2025, 26 pages, including translation.
Ericsson, "Mac CEs for activating an RS resource and handling corresponding TCI states", 3GPP TSG-RAN WG2 #100, Tdoc R2-1713533, Reno, US, Nov. 27-Dec. 1, 2017.

* cited by examiner

TRANSMISSION METHOD AND APPARATUS, COMMUNICATION NODE, AND STORAGE MEDIUM

CROSS REFERENCE TO RELATED APPLICATIONS

This is a National Stage Application filed under 35 U.S.C. 371 based on International Patent Application No. PCT/CN2021/090855, filed on Apr. 29, 2021, which claims priority to Chinese Patent Application No. 202010363319.6, filed with the China National Intellectual Property Administration (CNIPA) on Apr. 30, 2020, the disclosures of which are incorporated herein by reference in their entireties.

TECHNICAL FIELD

The present application relates to the field of communication and, in particular, to a transmission method and apparatus, a communication node, and a storage medium.

BACKGROUND

Multiple Transmission and Reception Points (Multi-TRP) joint transmission or reception is an important technology in wireless communication and plays a significant role in increasing the throughput of the wireless communication. Therefore, Long Term Evolution (LTE), Long Term Evolution-Advanced (LTE-A), New Radio Access Technology (NR) and other standards all support Multi-TRP transmission. Multi-Panel transmission is an important technology introduced by the NR. In the Multi-Panel transmission, multiple antenna panels are installed at a receiving end and/or a transmitting end so as to improve the spectral efficiency of a wireless communication system. In addition, in high-frequency communication scenarios, multi-beam transmission or reception of the Multi-TRP or the Multi-Panel is an effective means of improving reliability, that is, an effective means of improving the transmission reliability of the wireless communication system and, in particular, the transmission reliability of ultra-reliable and low latency communications (URLLC).

However, in high-frequency communication scenarios, how to enhance the reliability of control channel transmission is a technical problem to be solved urgently.

SUMMARY

The present application provides a transmission method and apparatus, a communication node, and a storage medium.

In a first aspect, an embodiment of the present application provides a transmission method. The method includes the following.

Control channel information and activated Transmission Configuration Indicator (TCI) are determined.

A correspondence between the control channel information and the activated TCI is determined.

A control channel corresponding to the control channel information is received based on the correspondence and the activated TCI.

In a second aspect, an embodiment of the present application provides a transmission method. The method includes the following.

Control channel information and activated TCI are indicated.

A control channel corresponding to the control channel information is sent.

In a third aspect, an embodiment of the present application provides a transmission apparatus. The apparatus includes an information determination module, a correspondence determination module, and a receiving module.

The information determination module is configured to determine control channel information and activated TCI.

The correspondence determination module is configured to determine a correspondence between the control channel information and the activated TCI.

The receiving module is configured to receive a control channel corresponding to the control channel information based on the correspondence and the activated TCI.

In a fourth aspect, an embodiment of the present application provides a transmission apparatus. The apparatus includes an indication module and a sending module.

The indication module is configured to indicate control channel information and activated TCI.

The sending module is configured to send a control channel corresponding to the control channel information.

In a fifth aspect, an embodiment of the present application provides a communication node. The communication node includes one or more processors and a storage apparatus configured to store one or more programs.

When executed by the one or more processors, the one or more programs cause the one or more processors to perform any method provided in embodiments of the present application.

In a sixth aspect, an embodiment of the present application provides a storage medium storing a computer program which, when executed by a processor, causes the processor to perform any method provided in embodiments of the present application.

DETAILED DESCRIPTION

Embodiments of the present application will be described hereinafter in detail with reference to the drawings. It is to be noted that if not in collision, embodiments of the present application and features therein may be combined with each other in any manner.

The steps illustrated in the flowcharts among the drawings may be performed by, for example, a computer system capable of executing a set of computer-executable instructions. Moreover, although logical sequences are illustrated in the flowcharts, the steps illustrated or described may be performed in sequences different from those described here in some cases.

Figure 1:
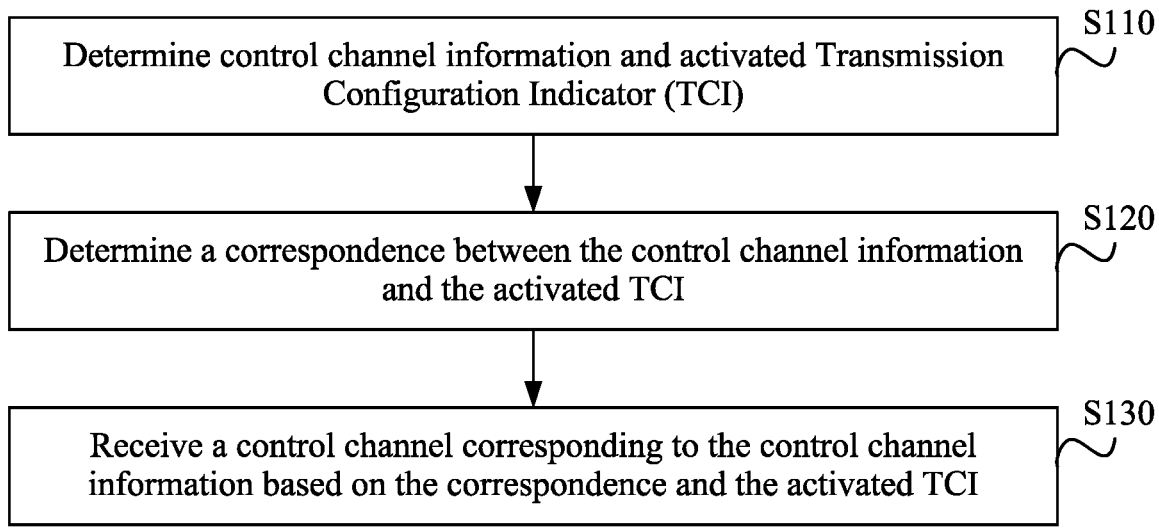
FIG. 1 is a flowchart of a transmission method according to an embodiment of the present application.

In an exemplary embodiment, FIG. 1 is a flowchart of a transmission method according to an embodiment of the present application, and this method may be applicable to the case of transmitting a control channel. This method may be performed by a transmission apparatus provided in the embodiments of the present application. The transmission apparatus may be implemented by software and/or hardware and integrated into a terminal. The terminal encompasses any suitable type of wireless user equipment.

The present application includes at least the following technical features: a physical downlink control channel (PDCCH), downlink control information (DCI), a physical uplink shared channel (PUSCH), a physical downlink shared channel (PDSCH), and user terminal (UE) which is referred to as the terminal in the present application.

In high-frequency communication scenarios, PDCCH transmission may be blocked due to beam occlusion and other reasons. If the PDCCH is blocked, the UE cannot receive the current DCI, and the corresponding PDSCH, PUSCH and other data transmission cannot be successfully scheduled. Therefore, the reception reliability of the PDCCH needs to be further enhanced. To solve the preceding technical problem, the present application provides a transmission method, and concepts in the present application are described below.

In New Radio (NR) and other standards, the PDCCH needs to be mapped to one or more control channel elements (CCEs) in a group of resource elements (REs). For example, the PDCCH includes one or more control channel elements (CCEs), where one RE includes one subcarrier in a frequency domain and one symbol in a time domain. A set of the one or more CCEs for transmitting the PDCCH may also be referred to as a control resource set (CORESET). The CORESET includes multiple physical resource blocks (PRBs) in the frequency domain and Z symbols in the time domain, where Z is a natural number. For example, Z may be an integer taken from 1, 2 or 3. The symbols here include, but are not limited to, one of the following: an orthogonal frequency-division multiplexing (OFDM) symbol, a Single-carrier Frequency-Division Multiple Access (SC-FDMA) or an orthogonal frequency-division multiple access (OFDMA). To monitor the PDCCH, candidate PDCCHs of a certain aggregation level are configured to be a set, and the set of candidate PDCCHs of this level is a search space (SS). A set of multiple SSs forms one search space set (SS set, SSSET, or SSS), and a radio resource control information element (RRC IE) search space defines one SSS. Each terminal may be configured with at least one SSS. To monitor the PDCCH, a PDCCH monitoring occasion of the current terminal and the monitored PDCCH candidate or the PDCCH candidate are configured in the SS. Where the occasion is also referred to as the PDCCH monitoring occasion, and the PDCCH monitoring occasion is determined by the PDCCH monitoring periodicity and offset on an activated downlink Bandwidth Part (BWP), the number of continuous slots for PDCCH monitoring, the number of continuous symbols for PDCCH monitoring and a PDCCH monitoring pattern within one slot. The PDCCH monitoring periodicity and offset on the activated downlink BWP may be the monitoringSlotPeriodicityAndOffset configured in the RRC IE SS, the number of continuous slots for PDCCH monitoring may be the number of continuous slots (that is, the duration) configured in the RRC IE SS, the number of continuous symbols for PDCCH monitoring may be the number of continuous symbols (that is, the duration) configured in an RRC IE ControlResourceSet, and the PDCCH monitoring pattern within one slot may be time domain information for monitoring the PDCCH determined by monitoringSymbolsWithinSlot configured in the RRC IE search space. One monitoring occasion is defined as a section of time domain symbols whose duration is the number of time domain symbols configured by the CORESET and whose a position of a starting symbol is determined by the monitoringSymbolsWithinSlot within one slot. A monitoring span is similar to the slot and is also a parameter describing a time-domain interval. The PDCCH candidate is also referred to as the PDCCH monitoring candidate and is a candidate PDCCH to be monitored configured in one SS. In addition, the PDCCH includes multiple formats, each format corresponds to a corresponding format of DCI, and each piece of DCI further includes multiple specific signaling indication fields, where monitoring may also be referred to as detection and blind detection and is mainly used for determining which of multiple candidate PDCCHs is the PDCCH used for transmitting the DCI to the terminal.

In the present application, one panel may correspond to one port group (for example, an antenna port group and an antenna group), and the panel and the port group are in a one-to-one correspondence and may also be replaced with each other. The panel refers to an antenna panel, and one transmission reception point (TRP) or one communication node (including but not limited to the terminal and a base station) may include at least one antenna panel. One or more antenna elements exist on each panel, and multiple elements may be virtualized into one antenna port. Antenna ports on one panel may be grouped into one port group. One panel may be further divided into multiple sub-panels, and multiple antenna ports included in each sub-panel may be divided into one port group. For example, in a dual-polarized antenna, an antenna with positive 45° polarization is one sub-panel, and an antenna with negative 45° polarization is one sub-panel. In the embodiments of the present application, both the panel and the sub-panel are collectively referred to as and represented by the panel, and the panel may be replaced by the port group (or spatial parameters, such as a transmit beam, a receive beam, a beam direction, and quasi-co-location type D).

As shown in FIG. 1, the transmission method provided in the present application includes the following.

In S110, control channel information and activated Transmission Configuration Indicator (TCI) are determined.

The control channel information may be understood as resource related to a control channel. The control channel is not limited here, and an exemplary control channel is the PDCCH. In an example, the control channel information may include one or more of the following: control channel time domain resource, control channel frequency domain resource, an SSS, a CORESET, a parameter configured in the CORESET by higher layer signaling, or a parameter configured in the SSS by the higher layer signaling.

The means of determining the control channel information and the activated TCI in S110 is not limited, and the control channel information and the activated TCI indicated by the base station may be acquired and determined. The base station may first configure the TCI for the terminal and then indicate the activated TCI among the configured TCI.

In S120, a correspondence between the control channel information and the activated TCI is determined.

In a case where the control channel information and the activated TCI are determined, in S120, the correspondence between the control channel information and the activated TCI may be determined, and different control channel information may correspond to different activated TCI. Then, based on the activated TCI and the correspondence, a control channel corresponding to the control channel information is received, so as to enhance the reliability of receiving the control channel.

In S120, the correspondence between the control channel information and the activated TCI may be determined based on the specific content of the control channel information, and the specific determination means is not limited here.

In S130, a control channel corresponding to the control channel information is received based on the correspondence and the activated TCI.

In a case where the correspondence is determined, the corresponding control channel may be received based on the correspondence and the activated TCI.

The present application provides a transmission method. The transmission method includes determining control channel information and activated TCI; determining a correspondence between the control channel information and the activated TCI; and receiving a control channel corresponding to the control channel information based on the correspondence and the activated TCI. By utilizing this method, the reliability of receiving the control channel is enhanced.

Based on the preceding embodiments, variant embodiments of the preceding embodiment are provided. It is to be noted here that for ease of description, only differences from the preceding embodiment are described in the variant embodiments.

In an embodiment, determining the activated TCI includes: determining L pieces of activated TCI, where L is greater than or equal to 1; in a case where L is greater than 1, the L pieces of activated TCI being TCI in different groups or the same group, and each group includes different configured TCI; or the L pieces of activated TCI being different TCI randomly selected from configured TCI.

The configured TCI may be the TCI configured by the base station to the terminal and may be configured through radio resource control (RRC) signaling. The activated TCI is then configured through a Media Access Control-Control Element (MAC-CE). The activated TCI may be different TCI randomly selected from the configured TCI or may be TCI selected from a configured TCI group.

In an embodiment, the control channel information includes one or more of the following: control channel time domain resource, control channel frequency domain resource, an SSS, a CORESET, a parameter configured in the CORESET by higher layer signaling, or a parameter configured in the SSS by the higher layer signaling.

In an embodiment, determining the correspondence between the control channel information and the activated TCI includes: determining a correspondence between different groups of monitoring time units in an SSS and the activated TCI.

Where the different groups of the monitoring time units correspond to different activated TCI.

The monitoring time units include at least one of: a monitoring occasion, a monitoring span, or a monitoring slot; and the different groups of the monitoring time units in the SSS are grouped based on a numerical order or parity of indices of the monitoring time units.

The monitoring time units may be divided into at least one group based on the numerical order of the indices of the monitoring time units. In this embodiment, the different groups of the monitoring time units may be established, such as a correspondence between the monitoring occasion and the activated TCI may be established. The control channel information in the present application includes the SSS and the parameter configured in the SSS by the higher layer signaling. Therefore, in this embodiment, a correspondence between the different groups of the monitoring time units in the SSS and the activated TCI is established, that is, the correspondence between the control channel information and the activated TCI is established.

In an embodiment, determining the correspondence between the control channel information and the activated TCI includes the following.

A correspondence between different groupings of SSSs and the activated TCI is determined, where the different groupings of the SSSs correspond to different activated TCI.

The different groupings of the SSSs are determined based on one of the following parameters SSSs associated with a certain CORESET or all configured SSSs: a numerical order of SSS indices, parity of the SSS indices, an SSS time domain parameter, or explicit configuration signaling.

In this embodiment, the correspondence between the different groupings of the SSSs and the activated TCI may be established, and the control channel information in the present application includes the SSSs. Therefore, in this embodiment, the correspondence between the different groupings of the SSSs and the activated TCI is established, that is, the correspondence between the control channel information and the activated TCI is established.

All SSSs associated with the CORESET may be grouped through the SSS, and all configured SSSS may also be grouped through the SSS. The number of groups may be determined based on the number of pieces of activated TCI, or the number of SSSs included in the group may be determined based on the number of pieces of activated TCI.

When grouping, the SSSs included in one group may be determined based on one of the following parameters of the SSSs: the numerical order of the SSS indices, the parity of the SSS indices, the SSS time domain parameter, or the explicit configuration signaling.

The SSSs may be grouped into at least one group based on the numerical order of the SSS indices. The explicit configuration signaling may be included in an SSS and used for indicating a group to which the SSS belongs.

In an embodiment, in the case of grouping based on the SSS time domain parameter, the grouping of the SSSs is determined based on duration configured in the CORESET corresponding to the SSS, a number of symbols in an interval between monitoring occasions, and k time domain symbols, where a value range of k is determined based on the duration configured in the CORESET and a preset value, and the number of symbols between the monitoring occasions is determined by the SSS time domain parameter; where the SSS time domain parameter includes one or more of the following configured in the SSS by the corresponding higher layer signaling: monitoring periodicity, a monitoring offset, or a monitoring pattern.

Exemplarily, in the present application, a grouping strategy may be determined based on the duration, the number of symbols between the monitoring occasions, and a value of k. In the case where the duration is less than or equal to the number of symbols in an interval between the monitoring occasions which is less than or equal to k, the corresponding SSSs may belong to a first group; and in the case where the number of symbols in an interval between the monitoring occasions is greater than or equal to k, the corresponding SSSs may belong to a second group. The first group and the second group are different groups.

k may be greater than or equal to the duration and less than or equal to the preset value. The preset value is not limited and may be determined according to the actual situation. For example, the preset value may be 13.

In an embodiment, this method further includes the following.

One or more of first signaling or second signaling are acquired.

The first signaling indicates that the control channel corresponding to the control channel information is received based on the correspondence between the control channel information and the activated TCI; and the second signaling indicates at least one of: a grouping mode of the different groups of the monitoring time units in the SSS or a group to which the SSS belongs.

In the case of determining the correspondence between the different groups of the monitoring time units and the activated TCI, the second signaling may indicate the grouping mode of the different groups of the monitoring time units in the SSS. In the case of determining the correspondence between the different groupings of the SSSs and the activated TCI, the second signaling may indicate the group to which the SSS belongs. Alternatively, in the case where the second signaling indicates the grouping mode of the different groups of the monitoring time units in the SSS, the correspondence between the different groups of the monitoring time units and the activated TCI is determined. In the case where the second signaling indicates the group to which the SSS belongs, the correspondence between the different groupings of the SSSs and the activated TCI is determined.

In an embodiment, determining the correspondence between the control channel information and the activated TCI includes the following.

A correspondence between control channel frequency domain resource and the activated TCI is determined, where different control channel frequency domain resources correspond to different activated TCI.

The different control channel frequency domain resources are determined based on an index value of an index of a PRB of frequency domain resource configured in a CORESET; or the different control channel frequency domain resources include frequency domain resource before duplication and frequency domain resource after duplication, where the frequency domain resource before duplication and the frequency domain resource after duplication do not overlap, and an index value of a PRB of the frequency domain resource after duplication is greater than or less than an index value of a PRB of the frequency domain resource before duplication.

The number of different control channel frequency domain resources may be determined based on the number of pieces of activated TCI. For example, the number of different control channel frequency domain resources is equal to the number of pieces of activated TCI. Based on the number of pieces of activated TCI, according to the index value of indices, the indices of PRBs of frequency domain resources configured in the CORESET are divided into different control channel frequency domain resources which correspond to different activated TCI.

In an embodiment, the method further includes acquiring at least one of: third signaling, fourth signaling, or fifth signaling.

The third signaling indicates that the different control channel frequency domain resources are determined based on the index value of the index of the PRB of the frequency domain resource configured in the CORESET and indicates that the corresponding control channel is received based on the correspondence between the control channel information and the activated TCI. The fourth signaling indicates that the different control channel frequency domain resources include the frequency domain resource before duplication and the frequency domain resource after duplication and indicates that the corresponding control channel is received based on the correspondence between the control channel information and the activated TCI. The fifth signaling indicates a position of the frequency domain resource after duplication.

In an embodiment, determining the correspondence between the control channel information and the activated TCI includes the following.

A correspondence between a scrambling identity (ID) of a demodulation reference signal (DMRS) of the control channel corresponding to the control channel information and the activated TCI is determined, where different scrambling IDs correspond to different activated TCI.

The number of scrambling IDs may be equal to the number of pieces of activated TCI.

In an embodiment, in a preset condition, the method further includes one of the following.

Each monitoring time unit of the channel control information corresponds to one piece of activated TCI, monitoring time units with adjacent indices correspond to different activated TCI, and a corresponding control channel is received by using the TCI corresponding to the monitoring time unit.

A corresponding control channel is received by using the activated TCI corresponding to an SSS with the lowest or highest SSS identity.

A corresponding control channel is received by using the activated TCI corresponding to a CORESET with the lowest or highest CORESET identity.

A corresponding control channel is received by using the activated TCI corresponding to a CORESET with the lowest or highest CORESET identity and a same CORESETPoolIndex as the SSS.

A corresponding control channel is received by using the activated TCI corresponding to a CORESET with the lowest or highest CORESET identity and a same CORESETPoolIndex as the CORESET.

In an embodiment, the preset condition includes at least one of: not having an ability to receive beams in at least two beam directions; being on a monitoring time unit where different SSSs overlap; or not receiving the activated TCI. That is, the preset condition includes that the terminal does not have the ability to receive beams in at least two beam directions; the terminal is currently on a monitoring time unit where different SSSs overlap; and the terminal does not receive the activated TCI.

Figure 2:
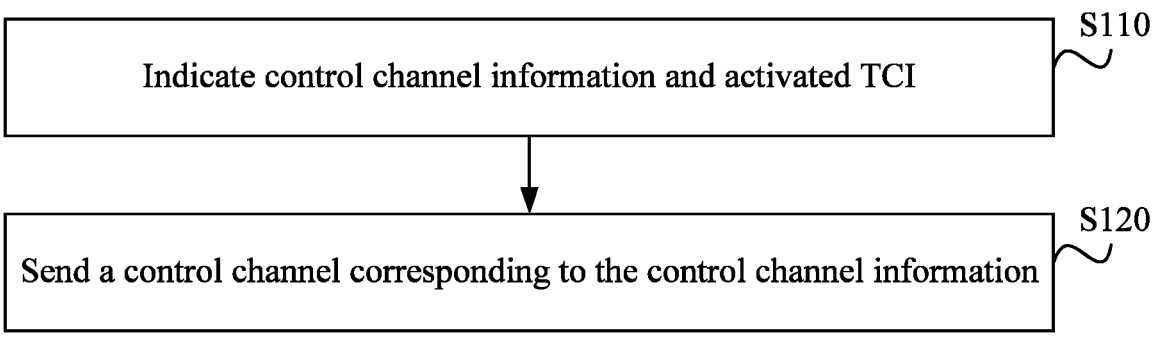
FIG. 2 is a flowchart of another transmission method according to an embodiment of the present application.

In an exemplary embodiment, the present application further provides a transmission method. FIG. 2 is a flowchart of another transmission method according to an embodiment of the present application. This method may be applicable to the case of transmitting a control channel. This method may be performed by a transmission apparatus provided in the present application. The transmission apparatus may be implemented by software and/or hardware and integrated into a base station. For the content that is not yet exhaustive in this embodiment, reference may be made to the preceding embodiments, which is not repeated here.

As shown in FIG. 2, the transmission method provided in this example includes the following.

In S210, control channel information and activated TCI are indicated.

In S210, the control channel information and the activated TCI may be indicated to a terminal, so as to implement reliable transmission of the control channel.

In S220, a control channel corresponding to the control channel information is sent.

In the transmission method provided in the present application, the control channel information and the activated TCI are indicated; and the control channel corresponding to the control channel information is sent. The reliability of the control channel is increased through this method.

Based on the preceding embodiments, variant embodiments of the preceding embodiment are provided. It is to be noted here that for ease of description, only differences from the preceding embodiment are described in the variant embodiments.

In an embodiment, indicating the activated TCI includes the following.

L pieces of activated TCI are indicated, where L is greater than or equal to 1.

In the case where L is greater than 1, the L pieces of activated TCI are TCI in different groups or the same group, and each group includes different configured TCI; or the L pieces of activated TCI are different TCI randomly selected from configured TCI.

The L pieces of activated TCI may be indicated by the MAC-CE.

In an embodiment, the control channel information includes one or more of the following: control channel time domain resource, control channel frequency domain resource, an SSS, a CORESET, a parameter configured in the CORESET by higher layer signaling, or a parameter configured in the SSS by the higher layer signaling.

In an embodiment, this method further includes one of the following.

Monitoring time units of an SSS are grouped based on a numerical order or parity of indices of the monitoring time units in the configured SSS.

SSSs are grouped based on duration configured in a CORESET corresponding to the SSS, a number of symbols in an interval between monitoring occasions, and k time domain symbols.

In an embodiment, this method further includes the following.

One or more of first signaling or second signaling are sent.

The first signaling indicates that the control channel corresponding to the control channel information is transmitted based on a correspondence between the control channel information and the activated TCI; and the second signaling indicates one of the following: a grouping mode of different groups of monitoring time units in an SSS or a group to which the SSS belongs.

In an embodiment, the method further includes sending at least one of: third signaling, fourth signaling, or fifth signaling.

The third signaling indicates that different control channel frequency domain resources are determined based on an index value of an index of a PRB of frequency domain resource configured in a CORESET and indicates that the corresponding control channel is received based on a correspondence between the control channel information and the activated TCI; the fourth signaling indicates that the different control channel frequency domain resources include frequency domain resource before duplication and frequency domain resource after duplication and indicates that the corresponding control channel is received based on the correspondence between the control channel information and the activated TCI; and the fifth signaling indicates a position of the frequency domain resource after duplication.

Frequency domain resources of different CORESETs are determined based on the index value of the index of the PRB of the frequency domain resource configured in the CORESET; or the frequency domain resources of different CORESETs include the frequency domain resource before duplication and the frequency domain resource after duplication, where the frequency domain resource before duplication and the frequency domain resource after duplication are adjacent and do not overlap, and an index value of a PRB of the frequency domain resource after duplication is greater than or less than an index value of a PRB of the frequency domain resource before duplication.

An exemplary description of the present application is made below.

In the present application, the technical problem of multi-beam transmission or reception of the control channel is solved. Specifically, in the present application, the case where the control channel information is PDCCH resource is used as an example. The operations executed by UE may include the following.

In S1, different PDCCH resources correspond to different TCI states.

In S2, based on S1, the PDCCH resources include at least one of: PDCCH time domain resource, PDCCH frequency domain resource, an SSS, a CORESET, a parameter configured in the CORESET by higher layer signaling, or a parameter configured in the SSS by the higher layer signaling.

In S3, based on S1, the UE receives multiple pieces of activated TCI. S3 corresponds to embodiment one.

In S4, based on S1 and S3, monitoring occasions in the SSS, that is, PDCCH monitoring occasions are grouped, where different groups correspond to different activated TCI. S4 corresponds to embodiment two.

In S5, based on S4, a grouping mode may be: a sequential order, that is, a numerical order of indices; and parity. S5 corresponds to embodiment two.

In S6, based on S1 and S3, different SSSs are grouped, where different SSS groups correspond to different pieces of activated TCI. S6 corresponds to embodiment three.

In S7, based on S6, the grouping mode may be a sequential order, parity, grouping based on time domain parameters, and explicit configuration. S7 corresponds to embodiment three.

In S8, based on S7, grouping is performed according to the time domain parameters, where the time domain parameters include one or more of the following configured in the SSS by corresponding higher layer signaling: monitoring periodicity, a monitoring offset, or a monitoring pattern. S8 corresponds to embodiment three.

In S9, based on S1 and S3, different CORESET frequency domain resources correspond to different activated TCI. S9 corresponds to embodiment four and embodiment five.

In S10, based on S9, different CORESET frequency domain resources include a first half of frequency domain resource and a second half of frequency domain resource on one CORESET, or CORESET frequency domain resources after and before duplication. S10 corresponds to embodiment four and embodiment five.

In S11, based on S1 and S3, different PDCCH scrambling IDs correspond to different activated TCI. S11 corresponds to embodiment six.

In S12, based on S1, one SSS is associated with multiple CORESETs. S12 corresponds to embodiment seven.

In S13, based on S1, in the case where a preset condition is satisfied, a behavior of the UE includes at least one of: each monitoring occasion corresponds to one activated TCI state, that is, TCI, and monitoring occasions with adjacent indices correspond to different activated TCI states; the UE receives the corresponding PDCCH by using a TCI state corresponding to an SSS with the lowest or highest SSS ID by default; or the UE receives the corresponding PDCCH by using a TCI state corresponding to a CORESET with the lowest or highest CORESET ID by default. The UE receives a corresponding control channel by using the activated TCI corresponding to a CORESET with the lowest or highest CORESET identity and a same CORESETPoolIndex as the SSS. S13 corresponds to embodiments two, three, four, five, six, seven and eight.

In S14, based on S13, the preset condition includes at least one of: the UE does not have an ability to simultaneously receive beams in two beam directions; the UE is currently on a monitoring occasion where different SSSS overlap; or the UE does not receive the activated TCI.

It is to be noted that the monitoring occasions described above are only exemplary descriptions and may also be a monitoring span, a monitoring slot, and the like.

Embodiment One is Described with Two Pieces of TCI as an Example

In this embodiment, it is assumed that the UE is configured with M CORESETs and N SSSs, where N≥M≥0. The preceding certain SSS is associated with the preceding certain CORESET, that is, in an RRC configuration parameter SS, a control resource set identity (CORESET ID) is a CORESET ID of the preceding CORESET. In the RRC configuration, the CORESET is used for configuring a TCI state field (such as, a tci-StatesPDCCH-ToAddList and a tci-StatesPDCCH-ToReleaseList) corresponding to the PDCCH and the maximum number of configured TCI states is maxNrofTCI-StatesPDCCH. Exemplarily, maxNrofTCI-StatesPDCCH=64. MAC-CE signaling activates two TCI states, and the two activated TCI states are from TCI states configured by the RRC in the preceding tci-StatesPDCCH-ToAddList. It is assumed that the number of TCI states configured in the tci-StatesPDCCH-ToAddList is X, X≤maxNrofTCI-StatesPDCCH, and the preceding two activated TCI states may be selected according to one of the following methods.

1. X TCI states configured in the tci-StatesPDCCH-ToAddList are divided into two groups, and the two activated TCI states are respectively from the preceding different groups. The grouping mode may be as follows: the first X/2 TCI states form a first group, and the last X/2 states form a second group; or TCI states with odd TCI state indices form a first group, and TCI states with even TCI state indices form a second group. The preceding TCI state indices may be TCI sequence numbers in the tci-StatesPDCCH-ToAddList, where the sequence numbers are from 0 to X; or the preceding TCI state indices may be actual TCI state identities configured in the RRC, that is, TCI-StateId values.

2. X TCI states configured in the tci-StatesPDCCH-ToAddList are divided into X/2 groups, and the two activated TCI states are respectively from the same group. The grouping mode may be as follows: according to TCI state index numbers, TCI states numbered 0 and 1 form a first group, TCI states numbered 2 and 3 form a second group, . . . , and so on. The preceding TCI state indices may be TCI sequence numbers in the tci-StatesPDCCH-ToAddList, where the sequence numbers are from 0 to X; or the preceding TCI state indices may be actual TCI-StateId values configured in the RRC.

3. Two different TCI states are randomly selected. That is, the MAC-CE simultaneously activates a first TCI state and a second TCI state with a different index ID from the first TCI state.

The preceding solution is described with a specific example. It is assumed that the UE is configured with M=1 CORESET and N=1 SSS, which are denoted as CORESET 1 and SSS 1, respectively. SSS 1 is associated with CORESET 1. In CORESET 1, six TCI states are configured in the RRC, these six TCI states are selected from a pool having 128 TCI states, and it is assumed that the TCI state indices are TCI 0, TCI 25, TCI 33, TCI 67, TCI 110, and TCI 120. Activation method 1 is as follows: TCI 0, TCI 25, and TCI 33 form the first group, and TCI 67, TCI 110, and TCI 120 are the second group, or TCI 0, TCI 33, and TCI 110 form the first group, and TCI 25, TCI 67, and TCI 120 are the second group; a codepoint of signaling corresponding to one MAC-CE indicates two TCI states among the six TCI states, and the two TCI states are from different groups, such as TCI 0 and TCI 25 activated by the MAC-CE. Activation method 2 is as follows: TCI 0 and TCI 25 form the first group, TCI 33 and TCI 67 are the second group, and TCI 110 and TCI 120 are the third group. Two TCI states activated by the MAC-CE are from the same group, for example, TCI 33 and TCI 67 activated by the MAC-CE are from the same group.

Embodiment Two, Time Division Multiplexing (TDM) 1

In this embodiment, it is assumed that the UE is configured with M CORESETs and N SSSs, where N≥M≥0. The preceding certain SSS is associated with the preceding certain CORESET, that is, in an RRC configuration parameter SS, a CORESET ID is a CORESET ID of the preceding CORESET. It is assumed that according to the method of embodiment one, MAC-CE signaling activates two TCI states in the tci-StatesPDCCH-ToAddList in the CORESET, which are denoted as the first TCI state and the second TCI state.

The preceding SSS is configured with many monitoring occasions in a time domain dimension. The monitoring occasions in the preceding SSS are divided into two groups, where the first group corresponds to the first TCI state, and the second group corresponds to the second TCI state. The corresponding meaning is that when the UE monitors the PDCCH on a certain monitoring occasion, the UE assumes that a DMRS port of the PDCCH and a reference signal configured in the TCI state corresponding to the monitoring occasion satisfy a quasi-co-location relationship. First signaling and second signaling are configured in the SSS or the CORESET, or one of the first signaling or the second signaling is configured in the SSS or the CORESET, where the first signaling refers to that after receiving the signaling, according to the preceding solution, the UE applies different TCI states to different monitoring occasion groups, receives the PDCCH, and performs blind detection; and the second signaling refers to that after receiving the signaling, the UE learns a grouping mode of the monitoring occasions of the SSS.

The preceding grouping mode may be one of the following methods.

1. Monitoring occasions of the first half in one slot or one span form the first group, and monitoring occasions of the second half are the second group.

2. Monitoring occasions with odd indices in one slot or one span form the first group, and monitoring occasions with even indices are the second group.

3. Monitoring slots of the first half within one monitoring period form the first group, and monitoring slots of the second half are the second group.

4. Monitoring slots with odd indices within one monitoring period form the first group, and monitoring slots with even indices are the second group.

If the UE does not have the ability to simultaneously receive beams in two beam directions, the preceding grouping mode of the monitoring occasions is not applied. In this case, each monitoring occasion corresponds to one activated TCI state, and the monitoring occasions with adjacent indices correspond to different activated TCI states. The reason why the UE does not have the ability to simultaneously receive beams in two beam directions may be that the UE has only one panel, or the UE has multiple panels but only one panel can be activated at the same time. The ability of the preceding UE may be reported to the base station.

Figure 2A:
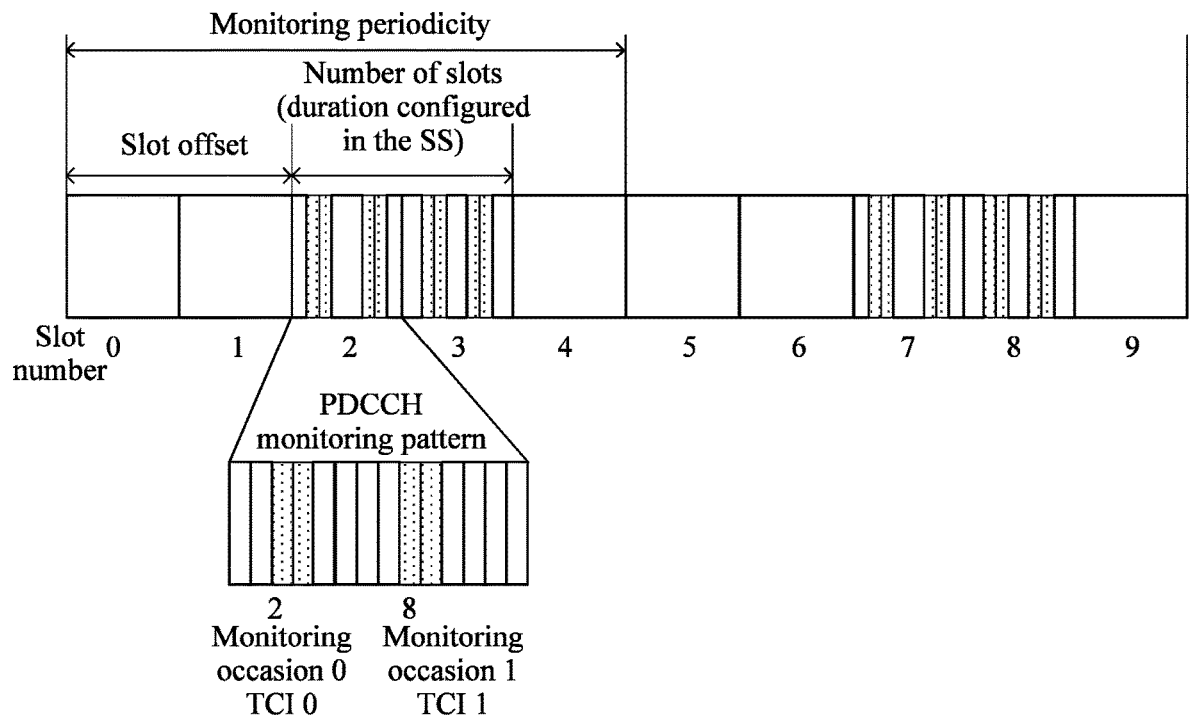
FIG. 2A is a diagram showing time domain configuration of a search space set (SSS) according to an embodiment of the present application.

The preceding solution is described with a specific example. It is assumed that the UE is configured with M=1 CORESET and N=1 SSS, which are denoted as CORESET 1 and SSS 1, respectively. SSS 1 is associated with CORESET 1. The MAC-CE activates two TCI states in CORESET 1, which are denoted as TCI 0 and TCI 1. FIG. 2A is a diagram showing time domain configuration of an SSS according to an embodiment of the present application. For the time domain configuration of SSS1, reference may be made to FIG. 2A, and each monitoring occasion occupies two time domain symbols. First signaling A is configured in the SSS, and a value of A may be 0 or 1. A=0 means receiving through an original method, and A=1 means grouping monitoring occasions in each monitoring slot configured in SSS 1. Different groups correspond to different TCI states. Assuming that grouping mode 1 is adopted, monitoring occasion 0 is the first group, and monitoring occasion 1 is the second group. Moreover, when the UE monitors the PDCCH on monitoring occasion 0, a DMRS port of the PDCCH and a reference signal configured in TCI 0 satisfy the quasi-co-location relationship; when the UE monitors the PDCCH on monitoring occasion 1, a DMRS port of the PDCCH and a reference signal configured in TCI 1 satisfy the quasi-co-location relationship. If the UE does not have the ability to simultaneously receive beams in two beam directions, the UE applies TCI 0 on monitoring occasion 0 and the UE applies TCI 1 on monitoring occasion 1.

Embodiment Three, TDM2

In this embodiment, it is assumed that the UE is configured with M CORESETs and N SSSs, where N≥M≥0. The preceding R SSSs are associated with the specific CORESET, where R≤N. That is, the CORESET identities configured in the R SSSs are all identities of the preceding CORESET. It is assumed that according to the method of embodiment one, MAC-CE signaling activates two TCI states in the tci-StatesPDCCH-ToAddList in the specific CORESET, which are denoted as the first TCI state and the second TCI state.

The first solution includes the following: the R SSSs associated with the specific CORESET are divided into two SSS groups, where a first SSS group corresponds to the first TCI state, and a second SSS group corresponds to the second TCI state. The corresponding meaning is that when the UE monitors the PDCCH on the monitoring occasion configured by a certain SSS, a DMRS port of the PDCCH and a reference signal configured in a TCI state corresponding to the SSS group satisfy the quasi-co-location relationship.

Alternatively, the second solution includes the following: all SSSs that the UE needs to monitor are divided into two SSS groups, where if the number of SSSs associated with a certain CORESET is Q, and 1<Q≤N, then some of the Q SSSs are from the first SSS group and some of the SSSs are from the second SSS group. The first SSS group corresponds to the first TCI state, and the second SSS group corresponds to the second TCI state. The corresponding meaning is that when the UE monitors the PDCCH on the monitoring occasion configured by a certain SSS, a DMRS port of the PDCCH and a reference signal configured in a TCI state corresponding to the SSS group satisfy the quasi-co-location relationship.

A grouping mode of the SSSs may be one of the following.

1. SSSs indexed by the first half of SSS identities (SSSIDs) belong to the first SSS group, and SSSS indexed by the second half of the SSSIDs belong to the second SSS group.

2. SSSs with odd SSSID indices belong to the first SSS group, and SSSs with even SSSID indices belong to the second SSS group.

3. Grouping is performed according to SSS time domain parameters, where the time domain parameters include PDCCH monitoring periodicity, a PDCCH monitoring offset, and a PDCCH monitoring pattern. The preceding time domain parameters determine a position of the monitoring occasion and the number of symbols configured by the SSS. That is, in the case where duration configured in the CORESET corresponding to the SSS≤the number of symbols in an interval between monitoring occasions≤k time domain symbols, the SSS belongs to the first SSS group; and in the case where the number of symbols in an interval between monitoring occasions≥k time domain symbols, the SSS belongs to the second SSS group. k is an integer, and a value range is: the duration configured in the CORESET corresponding to the SSS≤k≤13.

4. The RRC configures explicit signaling in the SSS to indicate which group the SSS belongs to. The signaling may be an SSS group identity (ID).

The first signaling is configured in the SSS or the CORESET, the second signaling is configured in the SSS, or one of the first signaling or the second signaling is configured in the SSS, where the first signaling refers to that after receiving the signaling, according to the preceding first solution or second solution, the UE receives PDCCHs on different monitoring occasions and performs blind detection; and the second signaling refers to that after receiving the signaling, the UE learns which SSS group the SSS belongs to, so as to learn a TCI state corresponding to the group, where the signaling may be an SSS group ID. The preceding two signaling may be configured separately or jointly encoded.

If the UE does not have the ability to simultaneously receive two beams, on a monitoring occasion where different SSSs overlap, the UE receives the corresponding PDCCH by using a TCI state corresponding to an SSS with the lowest SSS ID by default, or the UE receives the corresponding PDCCH by using a TCI state corresponding to an SSS with the highest SSS ID by default. The preceding monitoring occasion where different SSSs overlap refers to that, at a certain occasion, candidate time domain starting symbols of two SSSs receiving the corresponding PDCCH are the same.

The preceding solution is described with a specific example. It is assumed that the UE is configured with M=1 CORESET and N=2 SSSs, which are denoted as CORESET 1, SSS 1, and SSS 2, respectively. Both SSS 1 and SSS 2 are associated with CORESET 1. The MAC-CE activates two TCI states in CORESET 1, which are denoted as TCI 0 and TCI 1. It is assumed that the first signaling independently configured in the SSS is 1 bit, and a value of the first signaling being 1 indicates that the UE applies the preceding first solution. The second signaling is 1 bit, and the second signaling is an SSS group ID. The SSS group ID value configured in SSS 1 is 0, and the SSS group ID configured in SSS 2 is 1, indicating that SSS 1 belongs to the first SSS group and SSS 2 belongs to the second SSS group. After receiving the preceding signaling, the UE receives the corresponding PDCCH by using TCI 0 on the monitoring occasion configured in SSS 1 and receives the corresponding PDCCH by using TCI 1 on the monitoring occasion configured in SSS 2. If the UE does not have the ability to simultaneously receive two beams, on a monitoring occasion where SSS 1 and SSS 2 overlap, the UE receives the corresponding PDCCH by using TCI 0 or TCI 1 corresponding to SSS 1 or SSS 2 by default.

Embodiment Four, Frequency-Division Multiplexing (FDM) 1

In this embodiment, it is assumed that the UE is configured with M CORESETs and N SSSs, where N≥M≥0. The preceding certain SSS is associated with the preceding certain CORESET, that is, in an RRC configuration parameter SSS, a CORESET ID is a CORESET ID of the preceding CORESET. It is assumed that according to the method of embodiment one, MAC-CE signaling activates two TCI states in the tci-StatesPDCCH-ToAddList in the CORESET, which are denoted as the first TCI state and the second TCI state.

Third signaling is configured in the SSS or the CORESET. The UE receives the third signaling, indicating that the first half of frequency domain resource of the CORESET corresponds to the first TCI state, and the second half of frequency domain resource of the CORESET corresponds to the second TCI state. The first half and the second half are frequency domain resource corresponding to the first half and the second half of a bitmap of the frequency domain resource configured by CORESET in the RRC, that is, frequencyDomainResources. The corresponding meaning is that when the UE monitors the PDCCH on the monitoring occasion configured by the SSS, a DMRS port of the PDCCH included in the first half or the second half of the frequency domain resource in the CORESET and a reference signal configured in a TCI state corresponding to the part of frequency domain resource satisfy the quasi-co-location relationship.

If the UE does not have the ability to simultaneously receive two beams, the UE does not expect to be configured with the third signaling. In this case, each monitoring occasion of the SSS corresponds to one TCI state, monitoring occasions with adjacent indices correspond to different TCI states, and the preceding TCI states are from the first TCI state and the second TCI state.

The preceding solution is described with a specific example. It is assumed that the UE is configured with M=1 CORESET and N=1 SSS, which are denoted as CORESET 1 and SSS 1, respectively. SSS 1 is associated with CORESET 1. The MAC-CE activates two TCI states in CORESET 1, which are denoted as TCI 0 and TCI 1. It is assumed that the third signaling configured in the CORESET is 1 bit. The value of the third signaling is 1, indicating that the first half of frequency domain resource of the CORESET corresponds to TCI 0, and the second half of frequency domain resource corresponds to TCI 1. If the UE does not have the ability to simultaneously receive two beams, the UE ignores the third signaling. In this case, monitoring occasion 0 configured in SSS 1 corresponds to TCI 0, monitoring occasion 1 corresponds to TCI 1, monitoring occasion 2 corresponds to TCI 0, monitoring occasion 3 corresponds to TCI 1, . . . , and so on.

Embodiment Five, FDM2

In this embodiment, it is assumed that the UE is configured with M CORESETs and N SSSs, where N≥M≥0. The preceding certain SSS is associated with the preceding specific CORESET, that is, in an RRC configuration parameter SS, a CORESET ID is a CORESET ID of the preceding CORESET. It is assumed that according to the method of embodiment one, MAC-CE signaling activates two TCI states in the tci-StatesPDCCH-ToAddList in the CORESET, which are denoted as the first TCI state and the second TCI state.

Frequency domain resources of the preceding specific CORESET are duplicated in the frequency domain. The duplicated frequency domain resources of the CORESET, that is, the frequency domain resources after duplication, and the original frequency domain resources of the specific CORESET are adjacent to each other and do not overlap. The original CORESET frequency domain resources of the specific CORESET, that is, the frequency domain resources before duplication, correspond to the first TCI state, and the duplicated frequency domain resources of the CORESET correspond to the second TCI state. An index value of a PRB of the duplicated frequency domain resources of the CORESET is greater than an index value of a PRB of the original frequency domain resources of the specific CORESET, or the index value of the PRB of the duplicated frequency domain resources of the CORESET is less than the index value of the PRB of the original frequency domain resources of the specific CORESET. A frequency domain offset Xoffset may exist between the frequency domain resource after duplication and the frequency domain resource before duplication, where Xoffset≥0. The corresponding meaning is that when the UE monitors the PDCCH on the monitoring occasion configured by the SSS, a DMRS port of the PDCCH included in the specific CORESET or the duplicated CORESET and a reference signal configured in a TCI state corresponding to the part of frequency domain resource satisfy the quasi-co-location relationship.

Fourth signaling and fifth signaling are configured in the SSS or the CORESET. The fourth signaling indicates that the frequency domain resources of the preceding specific CORESET are duplicated in the frequency domain, and the fifth signaling indicates a frequency domain position of the duplicated CORESET. The fifth signaling takes effect only in the case where the fourth signaling takes effect. The preceding two signaling may be configured as an inclusive relationship in the SSS or CORESET of the RRC, or configured separately, or jointly encoded as 1-bit signaling. For example, the value of the signaling being 0 represents that the CORESET frequency domain resource is duplicated according to the preceding solution, the Xoffset between the duplicated CORESET frequency domain resource and the original CORESET frequency domain resource is equal to 0, and the index value of the PRB of the duplicated CORESET frequency domain resource is greater than the index value of the PRB of the original specific CORESET frequency domain resource; and the value of the signaling being 1 represents that the CORESET frequency domain resource is duplicated according to the preceding solution, the Xoffset between the duplicated CORESET frequency domain resource and the original CORESET frequency domain resource is equal to 0, and the index value of the PRB of the duplicated CORESET frequency domain resource is less than the index value of the PRB of the original specific CORESET frequency domain resource.

If the UE does not have the ability to simultaneously receive two beams, the UE does not expect to be configured with fourth signaling and fifth signaling. In this case, each monitoring occasion of the SSS corresponds to one TCI state, monitoring occasions with adjacent indices correspond to different TCI states, and the preceding TCI states are from the first TCI state and the second TCI state.

The preceding solution is described with a specific example. It is assumed that the UE is configured with M=1 CORESET and N=1 SSS, which are denoted as CORESET 1 and SSS 1, respectively. SSS 1 is associated with CORESET 1. The MAC-CE activates two TCI states in CORESET 1, which are denoted as TCI 0 and TCI 1. Assuming that the fourth signaling is configured in the CORESET and a value of the fifth signaling is configured to be 1, then the Xoffset between the duplicated CORESET frequency domain resource and the original CORESET frequency domain resource is equal to 0, and the index value of the PRB of the duplicated CORESET frequency domain resource is greater than the index value of the PRB of the frequency domain resource of CORESET 1. After receiving the preceding signaling, on the monitoring occasion configured by SSS 1, the UE corresponds to TCI 0 on the frequency domain resource corresponding to CORESET 1 and corresponds to TCI 1 on the duplicated frequency domain resource.

Embodiment Six, Single Frequency Network (SFN)

In this embodiment, it is assumed that the UE is configured with M CORESETs and N SSSs, where N≥M>0. The preceding certain SSS is associated with the preceding specific CORESET, that is, in an RRC configuration parameter SS, a CORESET ID is a CORESET ID of the preceding CORESET. It is assumed that according to the method of embodiment one, MAC-CE signaling activates two TCI states in the tci-StatesPDCCH-ToAddList in the CORESET, which are denoted as the first TCI state and the second TCI state.

In the preceding specific CORESET, scrambling IDs of DMRSs of two control channels, that is, PDCCH-DMRS-ScramblingID values are configured, and each PDCCH-DMRS-ScramblingID corresponds to the preceding TCI state activated by the MAC-CE. The corresponding meaning here is that for the same DCI payload, a DMRS sequence is scrambled with different scrambling IDs, and it is specified that a PDCCH DMRS port using the first scrambling ID and a reference signal in the first TCI state satisfy the quasi-co-location relationship, and a PDCCH DMRS port using the second scrambling ID and a reference signal in the second TCI state satisfy the quasi-co-location relationship. After receiving higher layer information, the UE may use two scrambling IDs to descramble PDCCHs that correspond to different TCI states and from different beam directions, respectively.

If the UE does not have the ability to simultaneously receive two beams, each monitoring occasion of the SSS corresponds to one TCI state, monitoring occasions with adjacent indices correspond to different TCI states, and the preceding TCI states are from the first TCI state and the second TCI state.

The preceding solution is described with a specific example. It is assumed that the UE is configured with M=1 CORESET and N=1 SSS, which are denoted as CORESET 1 and SSS 1, respectively. SSS 1 is associated with CORESET 1. The MAC-CE activates two TCI states in CORESET 1, which are denoted as TCI 0 and TCI 1. Two DMRS scrambling IDs are configured in CORESET 1, which are denoted as DMRS scrambling ID 0 and DMRS scrambling ID 1. A PDCCH DMRS port using DMRS scrambling ID 0 and a reference signal in TCI 0 satisfy the quasi-co-location relationship, and a PDCCH DMRS port using DMRS scrambling ID 1 and a reference signal in TCI 1 satisfy the quasi-co-location relationship. The UE descrambles the PDCCH from beam direction 0 by using DMRS scrambling ID 0, and the UE descrambles the PDCCH from beam direction 1 by using DMRS scrambling ID 1.

Embodiment Seven

In this embodiment, it is assumed that the UE is configured with M CORESETs and N SSSs, where N≥M≥0. One of the preceding SSSs is associated with P CORESETs, where P>1. The specific configuration method includes the following. P CORESET IDs are configured under the CORESET ID of the SSS configured by the RRC. When the UE receives the higher layer signaling, the UE attempts to perform blind detection on the PDCCH on the monitoring occasion configured by the SSS and the corresponding P CORESETs. Each CORESET is configured with one TCI state, indicating that a DMRS port of the PDCCH on the CORESET and a reference signal in the TCI state satisfy the quasi-co-location relationship.

If the UE does not have the ability to simultaneously receive beams in two directions, the UE adopts one of the following methods.

1. Each monitoring occasion of the preceding SSS corresponds to one TCI state, monitoring occasions with adjacent indices correspond to different TCI states, and the preceding TCI states are from TCI states configured in two CORESETs with the lowest (or highest) CORESET ID among the P CORESETs associated with the SSS.

2. Each monitoring occasion of the preceding SSS corresponds to one TCI state, where the TCI state is configured in the CORESET with the lowest (or highest) CORESET ID among the P CORESETs associated with the SSS.

The preceding solution is described with a specific example. It is assumed that the UE is configured with M=2 CORESETs and N=1 SSS, which are denoted as CORESET 1, CORESET 2, and SSS 1, respectively. SSS 1 is associated with CORESET 1 and CORESET 2. A TCI state of CORESET 1 activated by the MAC-CE is denoted as TCI 1, and a TCI state of CORESET 2 activated by the MAC-CE is denoted as TCI 2. If the UE does not have the ability to simultaneously receive beams in two directions and adopts method 1, monitoring occasion 0 configured in SSS 1 corresponds to TCI 1, monitoring occasion 1 corresponds to TCI 2, monitoring occasion 2 corresponds to TCI 1, monitoring occasion 3 corresponds to TCI 2, . . . , and so on.

Embodiment Eight

In this embodiment, it is assumed that the UE is configured with M CORESETs and M SSSs, where M≥0. Each of the preceding SSSs is associated with the preceding one specific CORESET, that is, in an RRC configuration parameter SS, a CORESET ID is a CORESET ID of the preceding CORESET. At least two different CORESET pool indices, which are denoted as CORESETPoolIndices, are configured in the preceding M CORESETs. At least two TRPs exist at the base station side, and different TRPs correspond to CORESETs configured with different CORESETPoolIndices and SSSs associated with the CORESETs. Two PDCCH beams with different beam directions may be simultaneously transmitted at the two TRPs.

If the UE does not have the ability to simultaneously receive two beams, on a monitoring occasion where SSSs corresponding to different TRPs overlap, the UE assumes that the DMRS port of the PDCCH and a reference signal in a TCI state corresponding to a CORESET corresponding to the preceding SSS and with the lowest CORESET ID satisfy the quasi-co-location relationship; or the UE assumes that the DMRS port of the PDCCH and a reference signal in a TCI state corresponding to a CORESET corresponding to the preceding SSS and with a relatively high CORESET ID satisfy the quasi-co-location relationship. On a monitoring occasion where SSSs corresponding to the same TRP overlap, the UE assumes that the DMRS port of the PDCCH and a reference signal in a TCI state corresponding to a CORESET with the lowest CORESET ID and the same CORESETPoolIndex as the CORESET satisfy the quasi-co-location relationship; or the UE assumes that the DMRS port of the PDCCH and a reference signal in a TCI state corresponding to a CORESET with a relatively high CORESET ID and the same CORESETPoolIndex as the CORESET satisfy the quasi-co-location relationship.

It is assumed that the CORESET is not configured with the tci-StatesPDCCH-ToAddList and the tci-StatesPDCCH-ToReleaseList, or the CORESET is configured with the preceding two items, but the UE does not receive an activation command that the MAC-CE activates the TCI state. In the preceding two cases, the UE does not receive the activated TCI. In this case, the UE assumes that the DMRS port of the PDCCH and a reference signal in a TCI state corresponding to a CORESET with the lowest CORESET ID and the same CORESETPoolIndex as the CORESET satisfy the quasi-co-location relationship; or the UE assumes that the DMRS port of the PDCCH and a reference signal in a TCI state corresponding to a CORESET with a relatively high CORESET ID and the same CORESETPoolIndex as the CORESET satisfy the quasi-co-location relationship.

The preceding solution is described with a specific example. It is assumed that the UE is configured with M=2 CORESETs and N=2 SSSs, which are denoted as CORESET 1, CORESET 2, SSS 1, and SSS 2, respectively. SSS 1 is associated with CORESET 1, and SSS 2 is associated with CORESET 2. A CORESETPoolIndex configured in CORESET 1 is denoted as CORESETPoolIndex 1, a CORESETPoolIndex configured in CORESET 2 is denoted as CORESETPoolIndex 2, where CORESETPoolIndex 1 CORESETPoolIndex 2. A TCI state of CORESET 1 activated by the MAC-CE is denoted as TCI 1, and a TCI state of CORESET 2 activated by the MAC-CE is denoted as TCI 2. After receiving the preceding higher layer signaling, if the UE does not have the ability to simultaneously receive beams in two beam directions, on a monitoring occasion where SSS 1 and SSS 2 overlap, the UE receives the PDCCH by using TCI 1 configured in CORESET 1 corresponding to SSS 1 or receives the PDCCH by using TCI 2 configured in CORESET 2 corresponding to SSS 2.

Figure 3:
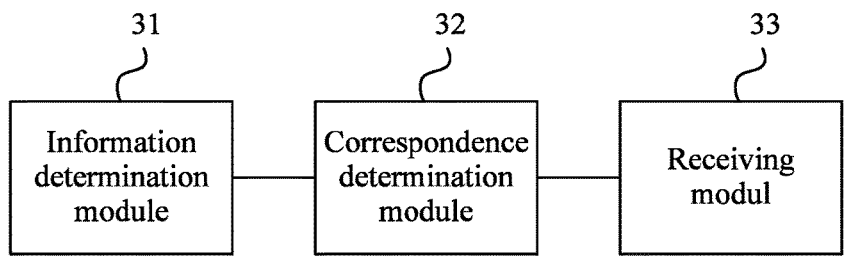
FIG. 3 is a structural diagram of a transmission apparatus according to an embodiment of the present application.

In an exemplary embodiment, the present application provides a transmission apparatus. FIG. 3 is a structural diagram of a transmission apparatus according to an embodiment of the present application. The transmission apparatus may be integrated on a terminal. As shown in FIG. 3, this apparatus includes: an information determination module 31, a correspondence determination module 32, and a receiving module 33. The information determination module 31 is configured to determine control channel information and activated TCI. The correspondence determination module 32 is configured to determine a correspondence between the control channel information and the activated TCI. The receiving module 33 is configured to receive a control channel corresponding to the control channel information based on the correspondence and the activated TCI.

The transmission apparatus provided in this embodiment is configured to perform the transmission method of the embodiment shown in FIG. 1. The transmission apparatus provided in this embodiment has implementation principles and technical effects similar to the transmission method of the embodiment shown in FIG. 1, which are not repeated here.

Based on the preceding embodiments, variant embodiments of the preceding embodiment are provided. It is to be noted here that for ease of description, only differences from the preceding embodiment are described in the variant embodiments.

In an embodiment, determining, by the information determination module 31, the activated TCI includes the following.

L pieces of activated TCI are determined, where L is greater than or equal to 1.

In the case where L is greater than 1, the L pieces of activated TCI are TCI in different groups or the same group, and each group includes different configured TCI; or the L pieces of activated TCI are different TCI randomly selected from configured TCI.

In an embodiment, the control channel information includes one or more of the following: control channel time domain resource, control channel frequency domain resource, an SSS, a CORESET, a parameter configured in the CORESET by higher layer signaling, or a parameter configured in the SSS by the higher layer signaling.

In an embodiment, the correspondence determination module 32 is configured to perform the following.

A correspondence between different groups of monitoring time units in an SSS and the activated TCI is determined, where the different groups of the monitoring time units correspond to different activated TCI.

The monitoring time units include at least one of: a monitoring occasion, a monitoring span, or a monitoring slot; and the different groups of the monitoring time units in the SSS are grouped based on a numerical order or parity of indices of the monitoring time units.

In an embodiment, the correspondence determination module 32 is configured to perform the following.

A correspondence between different groupings of SSSs and the activated TCI is determined, where the different groupings of the SSSs correspond to different activated TCI.

The different groupings of the SSSs are determined based on one of the following parameters SSSs associated with a certain CORESET or all configured SSSs: a numerical order of SSS indices, parity of the SSS indices, an SSS time domain parameter, or explicit configuration signaling.

In an embodiment, in the case of grouping based on the SSS time domain parameter, the grouping of the SSSs is determined based on duration configured in the CORESET corresponding to the SSS, a number of symbols in an interval between monitoring occasions, and k time domain symbols, where a value range of k is determined based on the duration configured in the CORESET and a preset value, and the number of symbols between the monitoring occasions is determined by the SSS time domain parameter; where the SSS time domain parameter includes one or more of the following configured in the SSS by the corresponding higher layer signaling: monitoring periodicity, a monitoring offset, or a monitoring pattern.

In an embodiment, this apparatus further includes a first acquisition module configured to perform the following.

One or more of first signaling or second signaling are acquired.

The first signaling indicates that the control channel corresponding to the control channel information is received based on the correspondence between the control channel information and the activated TCI; and the second signaling indicates at least one of: a grouping mode of the different groups of the monitoring time units in the SSS or a group to which the SSS belongs.

In an embodiment, the correspondence determination module 32 is configured to perform the following.

A correspondence between control channel frequency domain resource and the activated TCI is determined, where different control channel frequency domain resources correspond to different activated TCI.

The different control channel frequency domain resources are determined based on an index value of an index of a PRB of frequency domain resource configured in a CORESET; or the different control channel frequency domain resources include frequency domain resource before duplication and frequency domain resource after duplication, where the frequency domain resource before duplication and the frequency domain resource after duplication do not overlap, and an index value of a PRB of the frequency domain resource after duplication is greater than or less than an index value of a PRB of the frequency domain resource before duplication.

In an embodiment, this apparatus further includes a second acquisition module configured to acquire at least one of: third signaling, fourth signaling, or fifth signaling.

The third signaling indicates that the different control channel frequency domain resources are determined based on the index value of the index of the PRB of the frequency domain resource configured in the CORESET and indicates that the corresponding control channel is received based on the correspondence between the control channel information and the activated TCI; the fourth signaling indicates that the different control channel frequency domain resources include the frequency domain resource before duplication and the frequency domain resource after duplication and indicates that the corresponding control channel is received based on the correspondence between the control channel information and the activated TCI; and the fifth signaling indicates a position of the frequency domain resource after duplication.

In an embodiment, the correspondence determination module 32 is configured to perform the following.

A correspondence between a scrambling ID of a DMRS of the control channel corresponding to the control channel information and the activated TCI is determined, where different scrambling IDs correspond to different activated TCI.

In an embodiment, a transmission module is further included and configured to, in a preset condition, perform at least one of.

Each monitoring time unit of the channel control information corresponds to one piece of activated TCI, monitoring time units with adjacent indices correspond to different activated TCI, and a corresponding control channel is received by using the TCI corresponding to the monitoring time unit.

A corresponding control channel is received by using the activated TCI corresponding to an SSS with the lowest or highest SSS identity.

A corresponding control channel is received by using the activated TCI corresponding to a CORESET with the lowest or highest CORESET identity.

A corresponding control channel is received by using the activated TCI corresponding to a CORESET with the lowest or highest CORESET identity and a same CORESETPoolIndex as the SSS.

A corresponding control channel is received by using the activated TCI corresponding to a CORESET with the lowest or highest CORESET identity and a same CORESETPoolIndex as the CORESET.

In an embodiment, the preset condition includes at least one of: not having an ability to receive beams in at least two beam directions; being on a monitoring time unit where different SSSs overlap; or not receiving the activated TCI.

Figure 4:
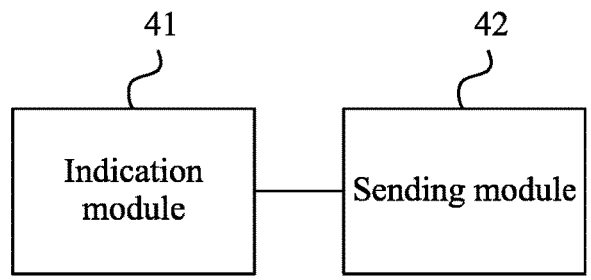
FIG. 4 is a structural diagram of another transmission apparatus according to an embodiment of the present application.

In an exemplary embodiment, the present application further provides a transmission apparatus. FIG. 4 is a structural diagram of another transmission apparatus according to an embodiment of the present application. The transmission apparatus may be integrated on a base station. As shown in FIG. 4, this apparatus includes an indication module 41 and a sending module 42. The indication module 41 is configured to indicate control channel information and activated TCI. The sending module 42 is configured to send a control channel corresponding to the control channel information.

The transmission apparatus provided in this embodiment is configured to perform the transmission method of the embodiment shown in FIG. 2. The transmission apparatus provided in this embodiment has implementation principles and technical effects similar to the transmission method of the embodiment shown in FIG. 2, which are not repeated here.

Based on the preceding embodiments, variant embodiments of the preceding embodiment are provided. It is to be noted here that for ease of description, only differences from the preceding embodiment are described in the variant embodiments.

In an embodiment, indicating, by the indication module 41, the activated TCI includes the following.

L pieces of activated TCI are indicated, where L is greater than or equal to 1.

In the case where L is greater than 1, the pieces of activated TCI are TCI in different groups or the same group, and each group includes different configured TCI; or the pieces of activated TCI are different TCI randomly selected from configured TCI.

In an embodiment, the control channel information includes one or more of the following: control channel time domain resource, control channel frequency domain resource, an SSS, a CORESET, a parameter configured in the CORESET by higher layer signaling, or a parameter configured in the SSS by the higher layer signaling.

In an embodiment, this apparatus further includes a grouping module configured to perform one of the following.

Monitoring time units of an SSS are grouped based on a numerical order or parity of indices of the monitoring time units in the configured SSS.

SSSs are grouped based on duration configured in a CORESET corresponding to the SSS, a number of symbols in an interval between monitoring occasions, and k time domain symbols.

In an embodiment, the sending module 42 of this apparatus is further configured to perform the following.

One or more of first signaling or second signaling are sent.

The first signaling indicates that the control channel corresponding to the control channel information is transmitted based on a correspondence between the control channel information and the activated TCI; and the second signaling indicates one of the following: a grouping mode of different groups of monitoring time units in an SSS or a group to which the SSS belongs.

In an embodiment, the sending module 42 is further configured to send at least one of: third signaling, fourth signaling, or fifth signaling.

The third signaling indicates that different control channel frequency domain resources are determined based on an index value of an index of a PRB of frequency domain resource configured in a CORESET and indicates that the corresponding control channel is received based on a correspondence between the control channel information and the activated TCI; the fourth signaling indicates that the different control channel frequency domain resources include frequency domain resource before duplication and frequency domain resource after duplication and indicates that the corresponding control channel is received based on the correspondence between the control channel information and the activated TCI; and the fifth signaling indicates a position of the frequency domain resource after duplication.

Frequency domain resources of different CORESETs are determined based on the index value of the index of the PRB of the frequency domain resource configured in the CORESET; or the frequency domain resources of different CORESETs include the frequency domain resource before duplication and the frequency domain resource after duplication, where the frequency domain resource before duplication and the frequency domain resource after duplication are adjacent and do not overlap, and an index value of a PRB of the frequency domain resource after duplication is greater than or less than an index value of a PRB of the frequency domain resource before duplication.

Figure 5:
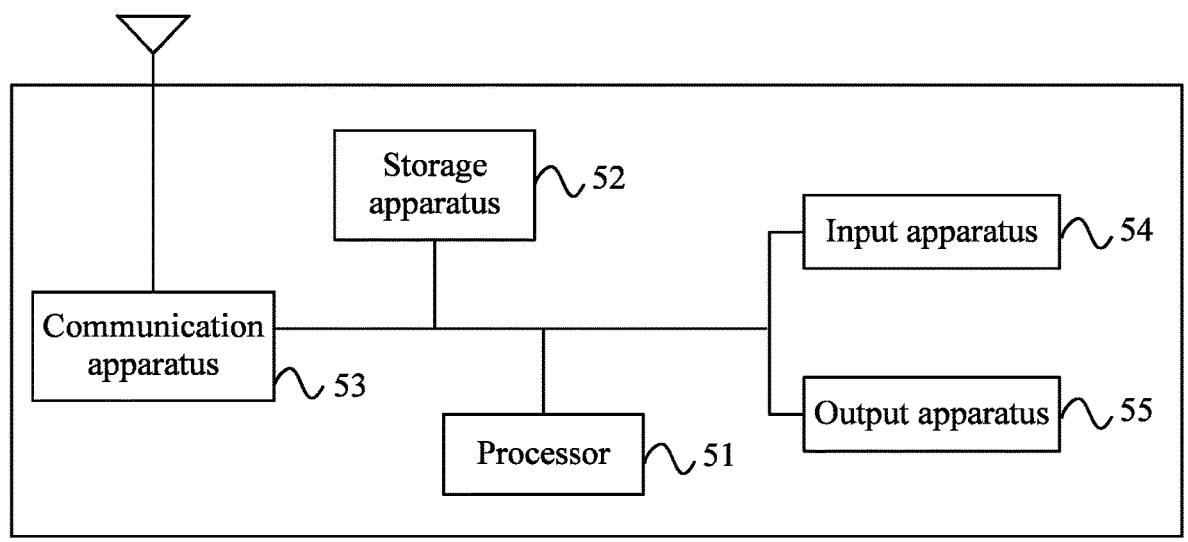
FIG. 5 is a structural diagram of a communication node according to an embodiment of the present application.

In an exemplary embodiment, an embodiment of the present application further provides a communication node. FIG. 5 is a structural diagram of a communication node according to an embodiment of the present application. The communication node that performs the method shown in FIG. 1 may be a terminal, and the communication node that performs the method shown in FIG. 2 may be a base station. As shown in FIG. 5, the communication node provided in the present application includes one or more processors 51 and a storage apparatus 52. One or more processors 51 are provided in the communication node. In FIG. 5, one processor 51 is used as an example. The storage apparatus 52 is configured to store one or more programs. The one or more programs are executed by the one or more processors 51 to cause the one or more processors 51 to perform the transmission method in the embodiments of the present application.

The communication node further includes a communication apparatus 53, an input apparatus 54, and an output apparatus 55.

The processor 51, the storage apparatus 52, the communication apparatus 53, the input apparatus 54 and the output apparatus 55 in the communication node may be connected via a bus or other means, with connection via the bus as an example in FIG. 5.

The input apparatus 54 may be configured to receive inputted digital or character information and generate key signal input related to user settings and function control of the communication node. The output apparatus 55 may include a display device, for example, a display screen.

The communication apparatus 53 may include a receiver and a transmitter. The communication apparatus 53 is configured to perform information transceiving and communication under the control of the one or more processors 51. The information includes, but is not limited to, control channel information, Transmission Configuration Indicator, control channels, first signaling, second signaling, third signaling, fourth signaling, and the like.

The storage apparatus 52 is used as a computer-readable storage medium, and the storage medium stores a computer program. When executed by the processor, the computer program causes the processor to perform any one of the methods described in the present application, and the storage medium may be configured to store software programs, computer-executable programs, and modules, such as program instructions/modules corresponding to the transmission method in the embodiments of the present application (for example, the information determination module 31, the correspondence determination module 32 and the receiving module 33 in the transmission apparatus; for another example, the indication module 41 and the sending module 42 in the transmission apparatus). The storage apparatus 52 may include a program storage region and a data storage region, where the program storage region may store an operating system and an application program required by at least one function while the data storage region may store data created depending on use of the communication node. Additionally, the storage apparatus 52 may include a high-speed random-access memory and may further include a nonvolatile memory, such as at least one disk memory, a flash memory, or another nonvolatile solid-state memory. In some examples, the storage apparatus 52 may further include memories which are remotely disposed with respect to the processor 51. These remote memories may be connected to the communication node via a network. Examples of the preceding network include, but are not limited to, the Internet, an intranet, a local area network, a mobile communication network, and a combination thereof.

A computer storage medium in the embodiments of the present application may use any combination of one or more computer-readable media. A computer-readable medium may be a computer-readable signal medium or a computer-readable storage medium. The computer-readable storage medium may be, but is not limited to, an electrical, magnetic, optical, electromagnetic, infrared, or semiconductor system, apparatus, or element, or any combination thereof. The computer-readable storage medium includes: an electrical connection having one or more wires, a portable computer magnetic disk, a hard disk, a random-access memory (RAM), a read-only memory (ROM), an erasable programmable read-only memory (EPROM), a flash memory, an optical fiber, a portable compact disc read-only memory (CD-ROM), an optical storage element, a magnetic storage device, or any suitable combination thereof. The computer-readable storage medium may be any tangible medium including or storing a program. The program may be used by or used in conjunction with an instruction execution system, apparatus, or element.

The computer-readable signal medium may include a data signal propagated in a baseband or as part of a carrier. The data signal carries computer-readable program codes. The data signal propagated in this manner may be in multiple forms and includes, and is not limited to, an electromagnetic signal, an optical signal, or any suitable combination thereof. The computer-readable signal medium may further be any computer-readable medium other than the computer-readable storage medium. The computer-readable medium may send, propagate, or transmit the program used by or used in conjunction with the instruction execution system, apparatus, or element.

The program codes included on the computer-readable medium may be transmitted on any suitable medium including, but not limited to, a wireless medium, a wire, an optical cable, a radio frequency (RF) and the like or transmitted on any suitable combination thereof.

Computer program codes for performing the operations of the present application may be written in one or more programming languages or combination thereof, including object-oriented programming languages such as Java, Smalltalk, C++, as well as conventional procedural programming languages such as "C" or similar programming languages. The program codes may be executed entirely on a user computer, partly on the user computer, as a stand-alone software package, partly on the user computer and partly on a remote computer, or entirely on the remote computer or a server. In the case relating to a remote computer, the remote computer may be connected to a user computer via any kind of network including a local area network (LAN) or a wide area network (WAN), or may be connected to an external computer (for example, via the Internet through an Internet service provider).

The preceding are only example embodiments of the present application and not intended to limit the scope of the present application.

It is to be understood by those skilled in the art that the term "terminal" covers any suitable type of radio UE, for example, a mobile phone, a portable data processing device, a portable web browser, or a vehicle-mounted mobile station.

In general, multiple embodiments of the present application may be implemented in hardware or special-purpose circuits, software, logic, or any combination thereof. For example, some aspects may be implemented in hardware while other aspects may be implemented in firmware or software that may be executed by a controller, a microprocessor, or another computing apparatus, though the present application is not limited thereto.

The embodiments of the present application may be implemented by computer program instructions executed by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules, and functions or may represent a combination of program steps with logic circuits, modules, and functions. A computer program may be stored in a memory. The memory may be of any type suitable for the local technical environment and may be implemented using any suitable data storage technology, such as, but not limited to, a read-only memory (ROM), a random-access memory (RAM) and an optical memory device and system (a digital video disc (DVD) or a compact disc (CD)). Computer-readable media may include non-transitory storage media. The data processor may be of any type suitable for the local technical environment, such as, but not limited to, a general-purpose computer, a special-purpose computer, a microprocessor, a digital signal processor (DSP), an application specific integrated circuit (ASIC), a field-programmable gate array (FPGA), and a processor based on a multi-core processor architecture.

What is claimed is:

1. A transmission method, comprising:
   determining control channel information and activated Transmission Configuration Indicator (TCI);
   determining a correspondence between the control channel information and the activated TCI; and
   receiving a control channel corresponding to the control channel information based on the correspondence and the activated TCI,
   wherein the determining the correspondence between the control channel information and the activated TCI comprises:
   determining a correspondence between different groupings of search space sets (SSSs) and the activated TCI, wherein the different groupings of the SSSs correspond to different activated TCI, and
   wherein the different groupings of the SSSs are determined based on one of the following parameters of SSSs associated with one CORESET or all configured SSSs: a numerical order of SSS indices, parity of the SSS indices, an SSS time domain parameter, or explicit configuration signaling.

2. The method of claim 1, wherein determining the activated TCI comprises:
   determining L pieces of activated TCI, wherein L is greater than or equal to 1; and
   in a case where L is greater than 1, the L pieces of activated TCI being TCI in different groups or a same group, and each group comprising different configured TCI; or the L pieces of activated TCI being different TCI selected from configured TCI.

3. The method of claim 1, wherein the control channel information comprises at least one of: control channel time domain resource, control channel frequency domain resource, an SSS, a control resource set (CORESET), a parameter configured in the CORESET by higher layer signaling, or a parameter configured in the SSS by the higher layer signaling.

4. The method of claim 1, wherein the determining the correspondence between the control channel information and the activated TCI comprises:
   determining a correspondence between different groups of monitoring time units in an SSS and the activated TCI, wherein the different groups of the monitoring time units correspond to different activated TCI;
   wherein each of the monitoring time units comprises at least one of: a monitoring occasion, a monitoring span, or a monitoring slot; and
   the different groups of the monitoring time units in the SSS are grouped based on a numerical order or parity of indices of the monitoring time units.

5. The method of claim 4, further comprising:
   acquiring at least one of first signaling or second signaling;
   wherein the first signaling indicates that the control channel corresponding to the control channel information is received based on the correspondence between the control channel information and the activated TCI; and
   the second signaling indicates at least one of the following: a grouping mode of the different groups of the monitoring time units in the SSS or a group to which the SSS belongs.

6. The method of claim 1, wherein in a case of grouping based on the SSS time domain parameter, the grouping of the SSSs is determined based on a duration configured in the CORESET corresponding to the SSS, a number of symbols in an interval between monitoring occasions, and k time domain symbols, wherein a value range of k is determined based on the duration configured in the CORESET and a preset value, and the number of symbols between the monitoring occasions is determined by the SSS time domain parameter;

wherein the SSS time domain parameter comprises at least one of the following configured in the SSS by higher layer signaling: monitoring periodicity, a monitoring offset, or a monitoring pattern.

7. The method of claim 1, wherein the determining the correspondence between the control channel information and the activated TCI comprises:

determining a correspondence between control channel frequency domain resource and the activated TCI, wherein different control channel frequency domain resources correspond to different activated TCI;

wherein the different control channel frequency domain resources are determined based on an index value of an index of a physical resource block (PRB) of frequency domain resource configured in a CORESET; or the different control channel frequency domain resources comprise frequency domain resource before duplication and frequency domain resource after duplication, wherein the frequency domain resource before duplication and the frequency domain resource after duplication do not overlap, and an index value of a PRB of the frequency domain resource after duplication is greater than or less than an index value of a PRB of the frequency domain resource before duplication.

8. The method of claim 7, further comprising: acquiring at least one of: third signaling, fourth signaling, or fifth signaling;

wherein the third signaling indicates that the different control channel frequency domain resources are determined based on the index value of the index of the PRB of the frequency domain resource configured in the CORESET and indicates that the control channel corresponding to the control channel information is received based on the correspondence between the control channel information and the activated TCI;

wherein the fourth signaling indicates that the different control channel frequency domain resources comprise the frequency domain resource before duplication and the frequency domain resource after duplication and indicates that the control channel corresponding to the control channel information is received based on the correspondence between the control channel information and the activated TCI; and wherein the fifth signaling indicates a position of the frequency domain resource after duplication.

9. The method of claim 1, wherein the determining the correspondence between the control channel information and the activated TCI comprises:

determining a correspondence between a scrambling identity (ID) of a demodulation reference signal (DMRS) of the control channel corresponding to the control channel information and the activated TCI, wherein different scrambling IDs correspond to different activated TCI.

10. The method of claim 1, wherein in a preset condition, the method further comprises one of the following:

each monitoring time unit of an SSS corresponding to one piece of activated TCI, monitoring time units with adjacent indices corresponding to different activated TCI, and receiving a corresponding control channel by using the TCI corresponding to the monitoring time unit;

receiving a corresponding control channel by using the activated TCI corresponding to an SSS with a lowest or highest SSS identity;

receiving a corresponding control channel by using the activated TCI corresponding to a CORESET with a lowest or highest CORESET identity;

receiving a corresponding control channel by using the activated TCI corresponding to a CORESET with a lowest or highest CORESET identity and a same CORESET pool index as the SSS; or receiving a corresponding control channel by using the activated TCI corresponding to a CORESET with a lowest or highest CORESET identity and a same CORESET pool index as the CORESET.

11. The method of claim 10, wherein the preset condition comprises at least one of: not having an ability to receive beams in at least two beam directions; being on a monitoring time unit where different SSSs overlap; or not receiving the activated TCI.

12. A transmission method, comprising:

indicating control channel information and activated Transmission Configuration Indicator (TCI); and sending a control channel corresponding to the control channel information, wherein determining the correspondence between the control channel information and the activated TCI comprises:

determining a correspondence between different groupings of search space sets (SSSs) and the activated TCI, wherein the different groupings of the SSSs correspond to different activated TCI, and wherein the different groupings of the SSSs are determined based on one of the following parameters of SSSs associated with one CORESET or all configured SSSs: a numerical order of SSS indices, parity of the SSS indices, an SSS time domain parameter, or explicit configuration signaling.

13. The method of claim 12, wherein indicating the activated TCI comprises:

indicating L pieces of activated TCI, wherein L is greater than or equal to 1; and in a case where L is greater than 1, the L pieces of activated TCI being TCI in different groups or a same group, and each group comprising different configured TCI; or the L pieces of activated TCI being different TCI randomly selected from configured TCI.

14. The method of claim 12, wherein the control channel information comprises at least one of: control channel time domain resource, control channel frequency domain resource, an SSS, a control resource set (CORESET), a parameter configured in the CORESET by higher layer signaling, or a parameter configured in the SSS by the higher layer signaling.

15. The method of claim 12, further comprising one of the following:

grouping monitoring time units of an SSS based on a numerical order or parity of indices of the monitoring time units in the configured SSS; or grouping SSSs based on a duration configured in a CORESET corresponding to the SSS, a number of symbols in an interval between monitoring occasions, and k time domain symbols, wherein a value range of k is determined based on the duration configured in the CORESET and a preset value.

16. The method of claim 12, further comprising:
sending at least one of first signaling or second signaling;
wherein the first signaling indicates that the control channel corresponding to the control channel information is transmitted based on a correspondence between the control channel information and the activated TCI; and
the second signaling indicates one of the following: a grouping mode of different groups of monitoring time units in an SSS or a group to which the SSS belongs.

17. The method of claim 12, further comprising sending at least one of the following: third signaling, fourth signaling, or fifth signaling; wherein the third signaling indicates that different control channel frequency domain resources are determined based on an index value of an index of a physical resource block (PRB) of frequency domain resource configured in a CORESET and indicates that the control channel corresponding to the control channel information is received based on a correspondence between the control channel information and the activated TCI; the fourth signaling indicates that the different control channel frequency domain resources comprise frequency domain resource before duplication and frequency domain resource after duplication and indicates that the control channel corresponding to the control channel information is received based on the correspondence between the control channel information and the activated TCI; and the fifth signaling indicates a position of the frequency domain resource after duplication;
wherein the different control channel frequency domain resources are determined based on the index value of the index of the PRB of the frequency domain resource configured in the CORESET; or the different control channel frequency domain resources comprise the frequency domain resource before duplication and the frequency domain resource after duplication, wherein the frequency domain resource before duplication and the frequency domain resource after duplication are adjacent and do not overlap, and an index value of a PRB of the frequency domain resource after duplication is greater than or less than an index value of a PRB of the frequency domain resource before duplication.

18. A transmission apparatus, comprising:
at least one processor; and
a storage apparatus configured to store one or more programs,
wherein when executed by the one or more processors, the one or more programs cause the one or more processors to perform:
determining control channel information and activated Transmission Configuration Indicator (TCI);
determining a correspondence between the control channel information and the activated TCI; and
receiving a control channel corresponding to the control channel information based on the correspondence and the activated TCI,
wherein the determining the correspondence between the control channel information and the activated TCI comprises:
determining a correspondence between different groupings of search space sets (SSSs) and the activated TCI, wherein the different groupings of the SSSs correspond to different activated TCI, and
wherein the different groupings of the SSSs are determined based on one of the following parameters of SSSs associated with one CORESET or all configured SSSs: a numerical order of SSS indices, parity of the SSS indices, an SSS time domain parameter, or explicit configuration signaling.

19. A non-transitory storage medium storing a computer program which, when executed by a processor, causes the processor to perform the transmission method of claim 1.

* * * * *